June 13, 1939.  T. H. THOMPSON  2,161,838

LEAF SPRING AND LINER CONSTRUCTION

Filed Oct. 30, 1936

INVENTOR.

TOM H. THOMPSON

BY Bates, Goldrick, & Teare

ATTORNEYS

Patented June 13, 1939

2,161,838

UNITED STATES PATENT OFFICE 2,161,838

LEAF SPRING AND LINER CONSTRUCTION

Tom H. Thompson, Detroit, Mich.

Application October 30, 1936, Serial No. 108,371

11 Claims. (Cl. 267—47)

This invention relates to an improvement in leaf springs, and to an improved liner for leaf springs. The general type of liner herein shown, is also disclosed in my copending application, 16,618, filed April 16, 1936, now Patent Number 2,105,869, January 18, 1938. One object is to improve leaf spring constructions for vehicles.

Another object is to provide an improved arrangement for securing different operative characteristics at predetermined zones of a single liner for a laminated leaf spring, whereby a vehicle equipped with such spring will have superior riding qualities at both high and low speeds.

A specific object is to provide a leaf spring liner which incorporates an improved device to prevent lateral movement of the liner with reference to the spring unit, which device will be of very simple construction and located in a protected position.

Other objects and features of the invention will become apparent from the following description relating to the accompanying drawing, showing the preferred forms. The essential characteristics are summarized in the claims.

Figure 1:
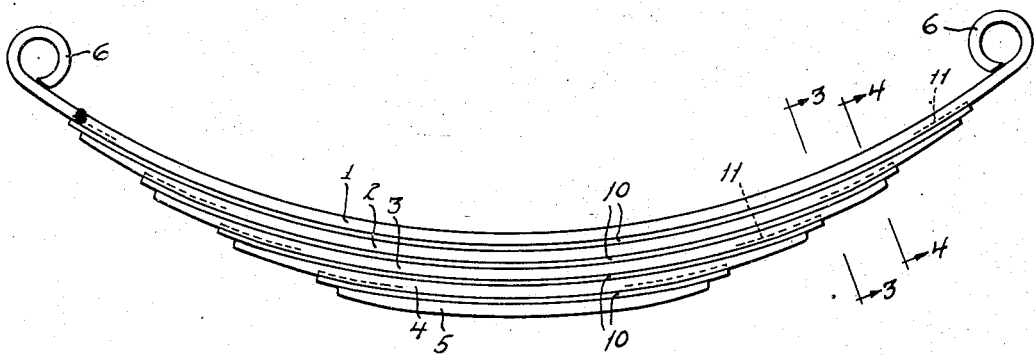
Figure 3:
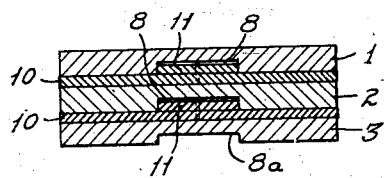
Figure 4:
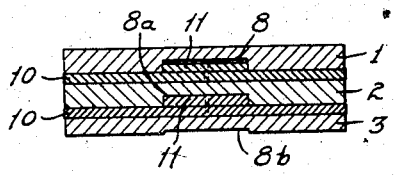
Figure 2:
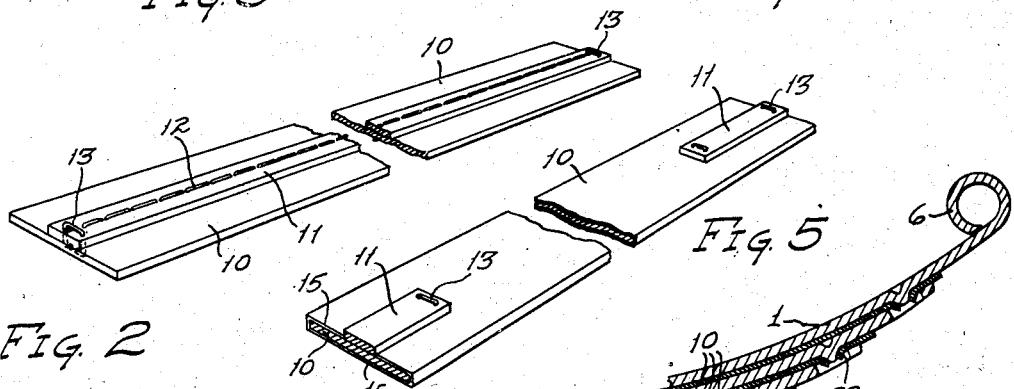
Figure 5:
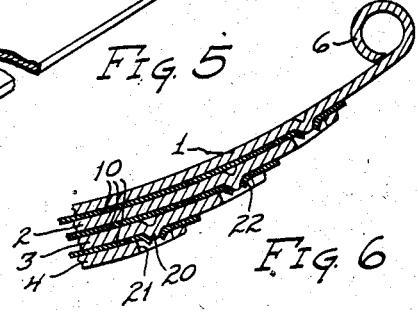
Figure 6:
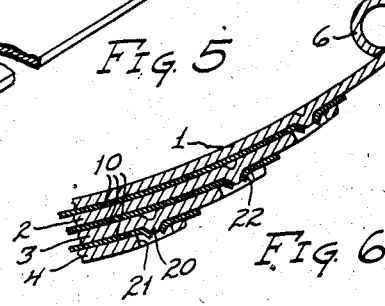
Figure 7:
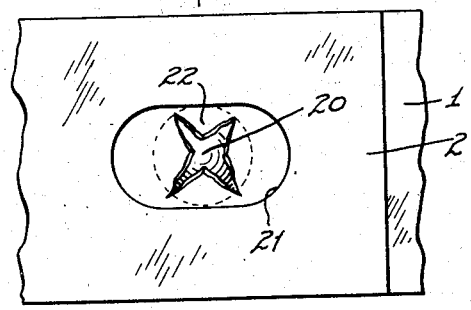
Figure 8:
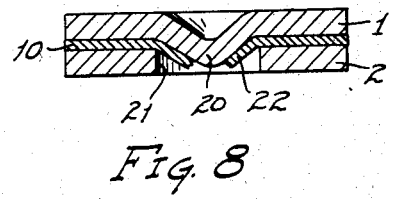

In the drawing, Fig. 1 is a side elevation of a leaf spring, incorporating my invention, said spring being adapted and arranged for supporting a vehicle body or chassis; Fig. 2 is a perspective view, showing one form of liner, broken away at the center; Figs. 3 and 4 are transverse sectional views through different portions of the spring at which the liner is present, as indicated by the lines 3—3 and 4—4 respectively on Fig. 1; Fig. 5 is a fragmentary relatively enlarged transverse sectional perspective view of a modified liner, on the same order as Figs. 2, 3 and 4; Fig. 6 is a fragmentary longitudinal sectional view of an end portion of a modified spring, showing a different form of liner; Fig. 7 is a fragmentary bottom plan view of a portion of the spring, showing details of construction of the spring and liner, according to Fig. 6, and Fig. 8 is a transverse, sectional view, taken as indicated by the line 8—8 on Fig. 7.

Referring further to the drawing, the metal leaves comprising the spring, as shown in Figs. 1, 3 and 4, are indicated at 1, 2, 3, 4 and 5, in order of diminishing length. The main leaf 1 may have end loops 6 for shackle connections; and the spring may of course, have any suitable clamping arrangement at the center, (not shown).

The spring leaves are usually of the same width throughout their length. For the greater portion of its extent, each leaf is substantially of even thickness. However, as shown on Fig. 1, the thickness may gradually increase from the extremity of each shorter leaf to a position somewhat beyond the overlapping end portion of the next adjacent shorter leaf. Moreover, each leaf is grooved longitudinally at 8. Such grooves may extend substantially the entire effective length of each leaf. If the "bottom" surface of each groove is maintained at equal distances from the opposite face of its leaf, the grooves, in effect, become shallower where the taper begins, as shown at 8a, Figs. 3 and 4. Finally the grooves may almost disappear as suggested at 8b, Fig. 4.

The liners may be made as shown in Fig. 2, that is, may comprise elongated sections 10 of flexible material, such as rubber, fabric, paper stock or the like, or combinations of the above or similar materials. These have longitudinal rib effects 11 thereon extending either for the full length (Fig. 2) or in appropriate sections (Fig. 5) for engagement with the grooves on the spring leaves. The rib effect 11 may be initially formed integrally with the main body portion of the strip, may be formed when in use by the compressive or wearing effects of the relatively raised portions of the spring leaves on the side margins of the liner, or may be made separately from the main body portion and fastened to it. The latter construction is that shown by Fig. 2. In Fig. 2 the relatively narrow strip is fastened to the wider strip, as by sewing with coarse stitching at 12. Near the ends of the liner the free ends of the stitching may be retained, as by wire staples 13.

It will be seen that because the rib effects 11 lie in the grooves 8 of the spring, and can abut both side walls of the grooves, the liners cannot work out laterally. Moreover, no portion of any liner has to be made wider than the spring leaves between which it is positioned; and the position retaining devices for the liners are effectively protected by the metal of the spring leaves.

Both portions of the liner (rib and body), may be made from the same or different materials. For example, both may be made from uncalendered chip-board stock (preferably recla'med cotton fibers), and either or both parts may contain means for increasing or decreasing the friction coefficient with respect to metal. Zonolite or some other form of mica or its equivalent may be included in the paper composition, as explained in my prior application, Serial No. 32,725, filed July 23, 1935, now Patent Number 2,107,455, February 8, 1938.

As explained in my two copending cases, it is important to reduce the friction between the liners and the spring leaves at certain places and to increase said friction at others. The theory of this is best explained in my application, Serial No. 16,618, wherein it is demonstrated that a spring liner which has a low coefficient of friction relative to the metal spring for the greater part of the extent of the liner and a high friction coefficient substantially at the areas of greatest weight transference during flexing movement of the spring at high speeds, (zones near the ends of the liners), this for all practical purposes, eliminates static friction and, at the same time, due to the increase in friction at the load-transference points of the spring at high speed, increases the dynamic friction, thereby providing a vehicle spring having improved riding qualities, both at high and low driving speeds.

I utilize the above described principles in the present arrangement. As shown in Figs. 1 to 4, this is by taking advantage of the decreased depth in the grooves 8 of the spring leaves, near the ends, which permit the rib effects 11 to bear tightly against the spring leaves at the end regions. As shown, for example, in Fig. 3, there is considerable clearance between the top surfaces of the ribs 11 and the adjacent surfaces of the grooves. This condition obtains for the greater part of the length of each liner. However, the condition illustrated at 8a occurs near the end of each liner, wherein the rib presses tightly against the top of the groove.

To reduce static friction, i. e., to reduce the friction between the liners and the leaves for the greater portion of the extent of the liners, I prefer to coat the entire liner with a material suited to its composition and which will act essentially as a lubricant. For example, the entire liner may be dipped into a composition comprising 40% graphite, 40% petrolatum and 20% paraffin. This will impregnate the fibrous material, of which the liner is preferably composed, and, at the end surfaces, where a characteristic friction pattern forms after a short period of service of the spring, this coating material is forced from between the liner and spring surfaces, leaving the body material of the liner in direct contact with the spring leaves and forming the friction pattern. The same thing happens as at 8a where the rib bears on the top surface of the groove.

Alternatively, I may coat the body portion 10 of each liner with a friction-reducing coating, such as indicated at 15, Fig. 5, and leave uncoated the stock forming the rib or rib sections 11. Thus a high friction coefficient will obtain at the zones of greatest load transferance immediately upon the spring being placed into service.

An alternative construction for preventing the liner from becoming laterally displaced is illustrated in Figs. 6 to 8. In these figures, 20 represents a protuberance which may be formed on each leaf, said protuberance being adapted to extend into an elongated opening 21, on the adjacent leaf. The elongated shape allows the protuberance to ride to and fro as the spring flexes. When the liners are put into place, the protuberances puncture or deform portions of the liners, as indicated at 22, and force the deformed portions to occupy the elongated openings, thereby to prevent sideward motion of the liners. As illustrated, the openings 21 are exposed on the spring. This would not, of course, be necessary, since the protuberances and openings could be nearer the center connection of the spring than as shown.

I claim:
1. A laminated leaf spring liner, comprising a flexible elongated base strip of substantially uniform thickness, and a flexible strip secured thereon, forming a rib inwardly from both side margins of the base strip, adapted to occupy a groove in one of two spring leaves which are spaced apart by the base strip.

2. A laminated leaf spring liner, comprising an elongated fibrous base strip of substantially uniform thickness, and a flexible strip secured thereon, forming a rib inwardly from both side margins of the base, adapted to occupy a groove in one of two spring leaves which are spaced apart by the base strip, and a coating of lubricant material on the base strip impregnating the fiber structure thereof.

3. A liner for spring leaves, comprising a flexible strip having a narrower strip fastened thereto, extending lengthwise thereof and located inwardly from its side edges for engagement with a groove in one of two spring leaves which are spaced apart by the liner.

4. A liner for spring leaves, comprising a flexible, non-metallic strip having a narrower strip stitched thereto, spaced inwardly from both edges, and means binding the stitches at both ends of the strip.

5. In a leaf spring, the combination of two leaves, one a spring leaf and the other a flexible, non-metallic liner for spacing leaves of the spring apart, one leaf having a rib and the other a groove, the broad face of the rib being out of contact with the groove, except at effective end portions of the rib.

6. In a leaf spring, the combination of two spring leaves, one of which is grooved, a liner between said leaves, said liner having marginal strips which operatively tend to decrease friction between the leaves, a portion of the liner having a friction-increasing surface lying within the groove, and seated against the face of the spring in said groove.

7. In a leaf spring, the combination of two spring leaves, one of which is grooved, a liner having marginal surfaces operatively tending to decrease friction between the leaves, and raised frictional members, on opposite ends of the liner arranged to enter the groove in face-to-face contact with the bottom thereof to prevent lateral displacement of the liner while dampening the motion of the spring at high flexing speeds.

8. In a leaf spring for automotive vehicles, said spring comprising a plurality of blades, a groove in one face of the blades, a strip of anti-friction material of substantially the same width as the blades and positioned between adjacent blades, and a second strip of anti-friction material between the blades and projecting into the grooves.

9. In a leaf spring for automotive vehicles, said spring comprising a plurality of blades, each blade having a longitudinal groove in its underside extending substantially the length of the blade and along the center line thereof, strips of anti-friction material of substantially the same width as the spring, one strip positioned between each two adjacent blades, and a narrower strip of antifriction material between each of the adjacent blades, said narrower strip attached to the first mentioned strip and extending into the groove.

10. In a leaf spring comprising a plurality of spring blades, certain of such blades having a groove in one face thereof, a strip of anti-friction material substantially the same width as the blades and positioned between adjacent blades, said strip having an elongated protuberance extending lengthwise of the strip and projecting into the groove in an adjacent spring blade.

11. A liner for spring leaves, comprising a strip of flexible material having a coating of friction-reducing material, one face of such liner being substantially uninterrupted, and the opposite face of such liner being interrupted by an outwardly projecting rib formation extending along the longitudinal center of the liner, said rib formation being of less width than the width of the liner and being spaced inwardly from the side edges of said liner.

TOM H. THOMPSON.